Aug. 9, 1966  J. R. BORDEN  3,265,957
VOLTAGE REGULATOR CIRCUIT
Original Filed Aug. 29, 1960  2 Sheets-Sheet 2

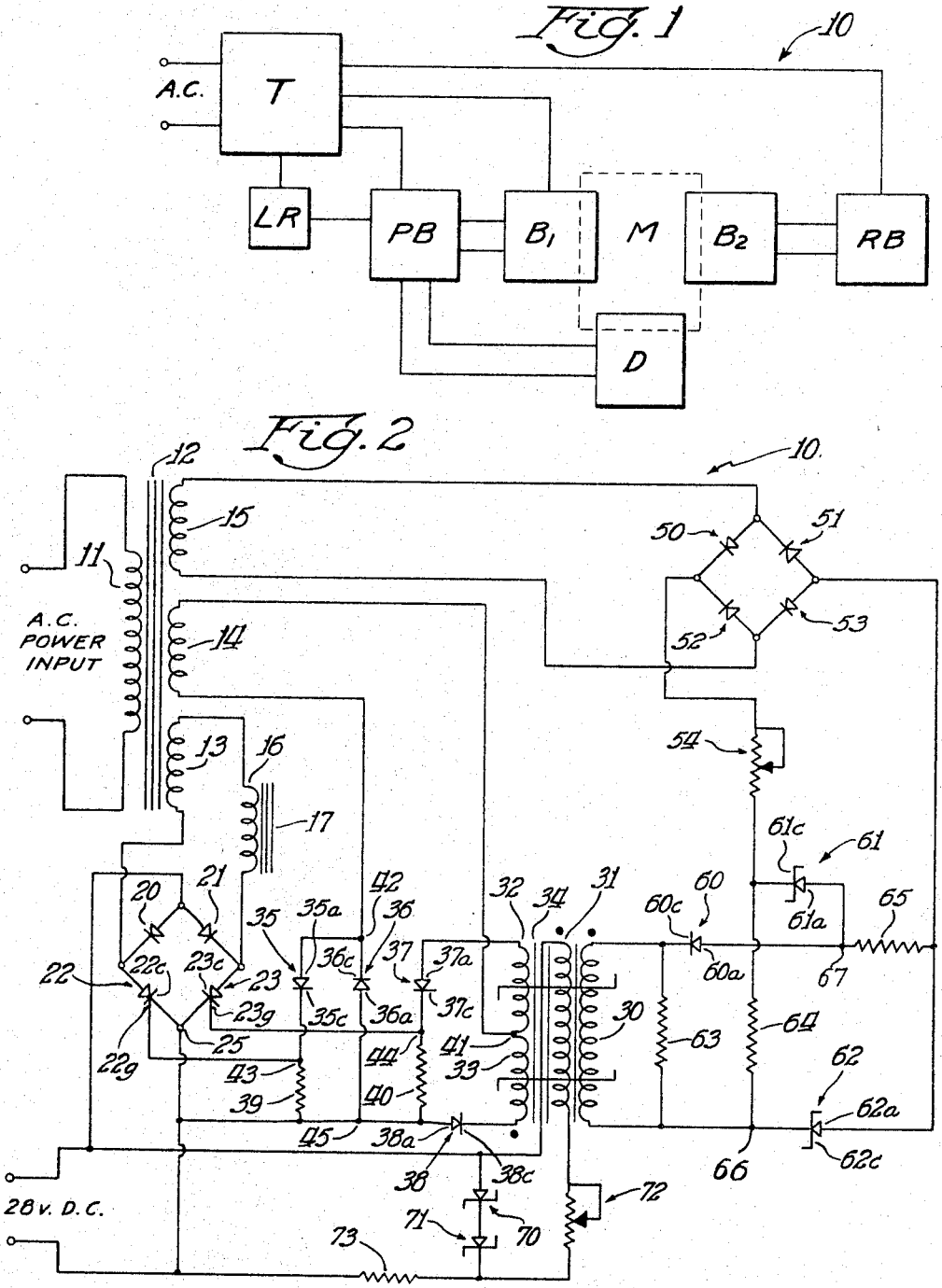

Inventor:
Jay R. Borden
By: James F. Jennings, Jr. Atty.

United States Patent Office 3,265,957
Patented August 9, 1966

3,265,957
VOLTAGE REGULATOR CIRCUIT
Jay R. Borden, La Canada, Calif., assignor to Borg-Warner Corporation, Chicago, Ill., a corporation of Illinois
Original application Aug. 29, 1960, Ser. No. 52,675, now Patent No. 3,223,922, dated Dec. 14, 1965. Divided and this application Jan. 25, 1965, Ser. No. 438,451
2 Claims. (Cl. 323—22)

This invention relates to a voltage regulator circuit for regulating the output voltage from an alternating current source, such as a static inverter or a rotary alternator. This application is a division of the application with the same title which issued as Patent No. 3,223,922 on December 14, 1965.

It is an object of the invention described and claimed in the above-identified patent to provide an improved voltage regulator circuit that is of high efficiency and is of compact construction and particularly adaptable for use with a static inverter. The circuit can be used, with slight modification for regulating the output voltage of a permanent magnet alternator by using back-winding voltage control.

It is a more particular object to provide an improved regulator circuit employing a linear reactor for controlling the power factor of an A.C. output voltage, a controlled rectifier power bridge circuit for controlling the linear reactor, a magnetic amplifier for controlling the power bridge circuit, and a reference bridge circuit responsive to changes in output voltage for controlling the magnetic amplifier.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIG. 1 is a block diagram of the improved regulator circuit of the present invention;

FIG. 2 is a schematic diagram of the complete regulator circuits;

Like characters of reference designate like parts in the several views.

Figure 4:
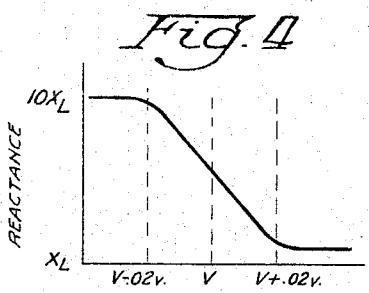
FIG. 4 is a reactance diagram for describing the action of the regulator circuit.

The voltage regulator circuit 10 of the present invention may be described generally in terms of the elements shown in the block diagram of FIG. 1. The circuit comprises a transformer T for connection to an A.C. source, a power bridge circuit PB, a linear reactor LR interconnected with the transformer T and power bridge circuit PB, a magnetic amplifier M, a reference bridge circuit RB, a first coupling bridge circuit $B_1$ interconnecting the magnetic amplifier M with the power bridge circuit PB, and a second coupling bridge circuit $B_2$ interconnecting the power bridge circuit PB with the reference bridge circuit RB. The circuit also includes a D.C. bias circuit D connected to control the operation of the magnetic amplifier M.

Referring to FIG. 2, the transformer T comprises a primary winding 11, a core 12 of magnetic material, and secondary windings 13, 14, and 15. The primary winding 11 is connected across the A.C. power terminals; the secondary winding 13 is connected to the power bridge circuit PB; the secondary winding 14 is connected to the coupling bridge circuit $B_1$; and the secondary winding 15 is connected to the reference bridge circuit RB.

The linear reactor LR comprises a winding 16 and a core 17 of magnetic material. The linear reactor is interconnected in series with the secondary winding 13 and the power bridge circuit PB.

The power bridge circuit PB comprises two silicon diodes 20 and 21 and two controlled rectifiers 22 and 23 connected in the arms of a conventional bridge circuit. Two terminals of the bridge circuit are connected through the linear reactor LR to the secondary winding 13, and the other terminals are connected to the D.C. line. Each of the controlled rectifiers 22 and 23 has a gate designated as 22g and 23g, respectively, which are connected to the coupling bridge circuit $B_1$. The controlled rectifiers also have cathodes designated as 22c and 23c which are connected together at a common junction 25 which is also connected to the coupling bridge circuit $B_1$.

The magnetic amplifier M comprises an input or control winding 30, a bias winding 31, output windings 32 and 33, and a saturable core 34. The input winding 30 is also an element of the coupling bridge circuit $B_2$, the output windings 32 and 33 are elements of the coupling bridge circuit $B_1$, and the bias winding 31 is an element of the D.C. bias circuit D.

The coupling bridge circuit $B_1$ comprises four silicon diodes 35, 36, 37, and 38, resistors 39 and 40, and the output windings 32 and 33 of the magnetic amplifier M. The diode 35 has an anode 35a and a cathode 35c, and the diodes 36, 37, and 38 each have an anode and a cathode similarly designated. The secondary winding 14 of the transformer T is connected to a junction 41 between the output windings 32 and 33 and to a function 42 between the anode 35a and the cathode 36c. The gate 22g of the controlled rectifier 22 is connected to a junction 43 between the cathode 35c and one end of the resistor 39. The gate 23g is connected to a junction 44 between the cathode 37c and one end of the resistor 40. The resistors 39 and 40 are interconnected to a junction 45 with the anodes 36a and 38a and with the junction 25 of the power bridge circuit PB. The output winding 32 is connected in series with the diode 37 between the junctions 41 and 44, and the winding 33 is connected in series with the diode 38 between junctions 41 and 45.

The reference bridge circuit RB comprises four silicon diodes 50, 51, 52, and 53 connected in a conventional bridge network with one diode in each arm of the bridge. The input terminals of the reference bridge circuit RB are connected with secondary winding 15 and the output terminals are connected through a rheostat 54 to the coupling bridge circuit $B_2$.

The coupling bridge circuit $B_2$ comprises a silicon diode 60, two Zener diodes 61 and 62, resistors 63, 64, and 65, and the control winding 30 of the magnetic amplifier M. The diode 60 has an anode 60a and a cathode 60c, and the Zener diodes 61 and 62 each have an anode and a cathode similarly designated. The control winding 30 of the magnetic amplifier M is connected in parallel with the resistor 63 to the cathode 60c and to a junction 66 between the cathode 62c and one end of the resistor 64. The other end of the resistor 64 is connected to the cathode 61c and through the rheostat 54 to the output terminal of the reference bridge circuit RB. The anode 62a is connected to one end of the resistor 65 and to the reference bridge circuit RB. The other end of the resistor 65 is connected to a junction 67 between the anodes 60a and 61a.

The D.C. bias circuit D comprises two Zener diodes 70 and 71, a rheostat 72, a resistor 73, and the bias winding 31 of the magnetic amplifier M. The Zener diodes 70 and 71 are connected in series and together are connected in parallel with the series combination of the bias winding 31 and rheostat 72. The parallel combination just described is connected in series with resistor 73 to the terminals of a 28 volt D.C. power source.

In operation, the circuit 10 functions to regulate the output voltage from the A.C. power source by effectively placing more or less inductance across the A.C. power terminals on a time-sharing basis. It is contemplated that the A.C. output is capacitive in character and regulation is accomplished by effectively tuning the A.C. output by means of a variable inductor. The mechanism by which this regulation is accomplished will now be described.

The variable inductance for regulating the A.C. output voltage is provided by the linear reactor LR which is connected to the secondary winding 13 of the transformer T. The linear reactor LR is effective only when current flows through the winding 16, and this current flow is controlled by the power bridge PB. Current flows through the winding 16 during a portion of each half cycle when one of the controlled rectifiers 22 or 23 is triggered into conduction. The signal for firing the rectifiers 22 or 23 is obtained from the coupling bridge circuit B₁. The voltage for maintaining the rectifiers 22 and 23 in the state of conduction once they have been fired is provided by the 28 bolt D.C. source. The inductive reactance reflected back to the A.C. power source is a direct function of the time during each cycle that current flows through linear reactor LR.

The firing signals for the controlled rectifiers 22 and 23 obtained from the coupling bridge circuit B₁ are controlled by the magnetic amplifier M. The magnetic amplifier M, in turn, is controlled by the D.C. bias circuit D and by the reference bridge circuit RB, as will be described subsequently.

During one-half cycle, voltage developed across the secondary winding 14 causes current to flow through winding 32, diode 37, resistor 40, and diode 36 back to the winding 14. The magnetude of the current flow is relatively small until the core 34 of the magnetic amplifier M reaches saturation. The point at which the core 34 reaches saturation is determined by the D.C. bias circuit D and the reference bridge circuit RB. When the core 34 is saturated, the magnitude of the current increases substantially and the increased voltage developed across the resistor 40 due to the increased IR drop is applied to the gate 23g and triggers the rectifier 23 into conduction. Current then flows through the core 16 of the linear reactor LR and the controlled rectifier 23 for the remainder of the half cycle.

During the alternate half cycle, voltage applied from the secondary winding 14 causes current to flow through diode 35, resistor 39, diode 38, and winding 33 back to the secondary winding 14. Again, the magnitude of the current is relatively small until the core 34 reaches saturation. When this occurs, the current increases substantially and the increased IR drop across the resistor 39 triggers the controlled rectifier 22 into conduction. Current again flows through the coil 16 and the controlled rectifier 22 for the remainder of the half cycle.

Figure 3:
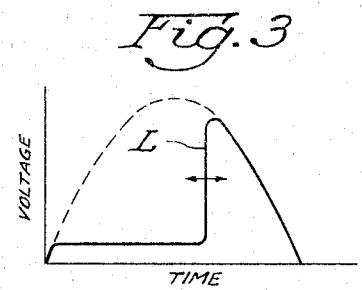
FIG. 3 is a diagram of a voltage wave as a function of time for describing the operation of the regulator circuit.

Referring to FIG. 3, there is illustrated one-half of an A.C. voltage wave in dotted line and the voltage appearing across the linear reactor LR is illustrated by the solid line. The voltage across the coil 16 is negligible until one of the rectifiers 22 or 23 is triggered into conduction. When one of the rectifiers does fire, however, the voltage increases abruptly along the line designated L. The value of the voltage rises to the dotted line value and then drops with the decreasing line voltage.

The leading edge L of the voltage wave of FIG. 3 is time variable as determined by the magnetic amplifier M. The state of saturation of the magnetic amplifier M is controlled by the D.C. bias circuit D and the reference bridge circuit RB. The bias winding 31 normally biases the magnetic amplifier M into a cut-off condition, and the magnetomotive force established by the bias winding 31 must be overcome by signals applied to the windings 30 and 32 or 30 and 33. The voltage for controlling the bias winding 31 is obtained from the 28 volt D.C. line and is regulated at some stable value by the Zener diodes 70 and 71. The voltage across the coil 31 is adjusted by means of the rheostat 72 connected in series with it.

The reference bridge circuit RB is connected across the secondary winding 15 of the transformer T and provides a full-wave rectified output voltage that is directly proportional to the A.C. input voltage. This rectified D.C. voltage is applied through the rheostat 54 to the coupling bridge circuit B₂. The pulsating D.C. voltage is applied across the portion of the bridge circuit B₂ comprising the Zener diodes 61 and 62. Whenever the voltage exceeds the level established by the diodes 62 and 61, current flows through the diode 60 and control winding 30 and tends to drive the core 34 into saturation. The extent to which current flowing through the coil 30 tends to saturate the core 34, therefore, depends upon the extent to which the A.C. line voltage exceeds or is less than its normal operating value.

When the A.C. output voltage rises above its operating level, the voltage obtained from the reference bridge circuit drives the magnetic amplifier M into saturation at an earlier point in time causing one of the controlled rectifiers 22 or 23 to fire and allowing a greater amount of current to flow through LR, thus decreasing the amount of inductive reactance in the circuit. Conversely, when the A.C. line voltage drops below the desired operating level, the voltage obtained from the reference bridge circuit RB retards the time at which the magnetic amplifier M goes into saturation, and consequently, reduces the amount of current flowing through LR and correspondingly increases the amount of inductive reactance across the A.C. terminals.

Referring to FIG. 4, there is illustrated a diagram describing the relative change in inductive reactance $X_L$ inserted into or removed from the circuit with variations in output voltage. In a preferred embodiment, when an A.C. voltage rises as much as 2% or more above its normal operating level, the inductive reactance drops to some minimal value $X_L$. When the output voltage drops 2% or more below its normal operating level, the inductive reactance increases to a value of 10 $X_L$.

Figures 5, 6:
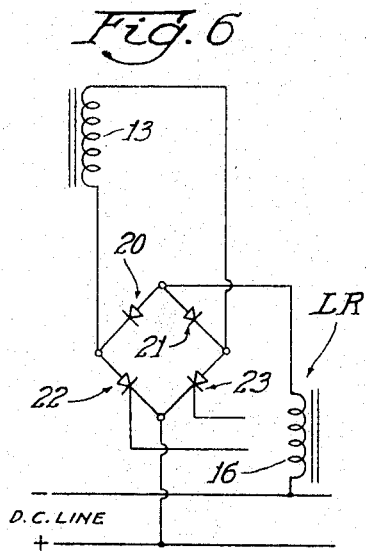
FIGS. 5, 6 and 7 are slight modifications of a portion of the schematic diagram of FIG. 2.

Referring to FIG. 5, there is illustrated a modification of a portion of the schematic diagram of FIG. 2, in which the power bridge circuit PB is no longer connected to the D.C. line, but the output terminals are directly interconnected. The power for driving the controlled rectifiers 22 and 23 is obtained from the A.C. line and is rectified by the diodes 20 and 21. The modified circuit of FIG. 5 functions in the same manner as the circuit of FIG. 2 for regulating the output voltage.

Referring to FIG. 6, there is illustrated still another modification of the circuit diagram of FIG. 2 in which the linear reactor LR is interconnected between the power bridge circuit PB and the D.C. line. The power bridge circuit PB is connected directly across the secondary winding 13. Current flows in only one direction through the coil 16 of the linear reactor LR, but the current is controlled by the rectifiers 22 and 23 in the same manner as previously described.

Figure 7:
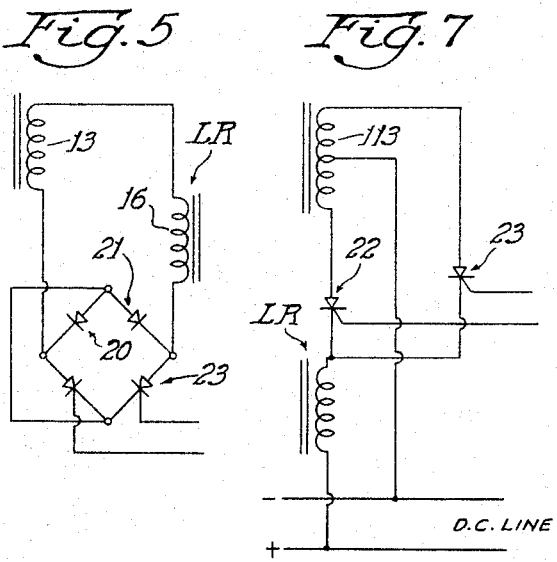

Referring to FIG. 7, there is illustrated still another modification in which a center-tapped secondary winding 113 is substituted for the winding 13 and the diodes 20 and 21 are eliminated. The linear reactor LR is interconnected between the controlled rectifiers 22 and 23 and the D.C. line. The rectifiers 22 and 23 fire on alternate half cycles and their conduction is controlled as previously described.

The voltage regulator circuit of FIG. 2 can be readily adapted to control the output voltage of a rotary alternator by a slight circuit modification and by substituting a back winding BW for the linear reactor LR.

Figure 8:
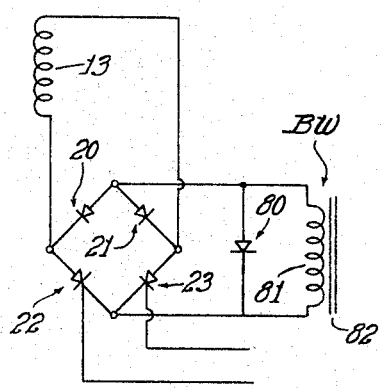
FIGS. 8 and 9 are also modifications of the schematic diagram of FIG. 2 as adapted to be used with a permanent magnet alternator.

Referring to FIG. 8, there is illustrated such a modification in which a diode 80 and winding 81 are substituted for the linear reactor LR. An iron shell 82 is substituted for the core 17 of the linear reactor LR. The controlled rectifiers 22 and 23 are fired as previously described, and the diode 80 is included to be sure the rectifiers shut off.

Figure 9:
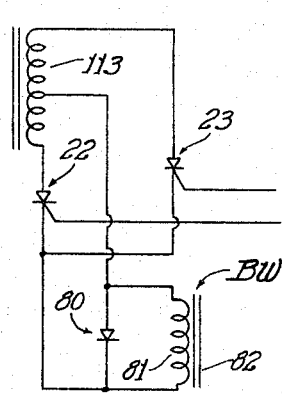

Referring to FIG. 9, there is illustrated a modification of the circuit of FIG. 8 which utilizes a center-tapped secondary winding 113 similar to that shown in FIG. 7. The controlled rectifiers 22 and 23 fire on alternate half cycles as previously described.

The manner of regulation utilizing back winding control is somewhat different from that described utilizing a linear reactor. The current flowing through the back winding 81 controls the amount of flux present in the stator of the rotary alternator and thereby controls the amount of voltage generated by the rotary alternator.

There has been provided by this invention, an improved voltage regulator circuit that can be used with either a static inverter or a rotary alternator. In either system, the A.C. output voltage is regulated on a time-sharing basis by a magnetic amplifier which, in turn, is responsive to changes in A.C. output voltage. The magnetic amplifier controls the conduction of two controlled rectifiers which, in turn, control the current flowing through a magnetic induction device. The current through the induction device is turned on and off by the controlled rectifiers during each half cycle of the A.C. voltage wave. The amount of inductive reactance developed, therefore, is a direct function of the fraction of time that current flows through the induction device.

It is to be understood that the invention is not to be limited to the specific constructions and arrangements shown and described, except only insofar as the claims may be so interpreted, as it will be understood to those skilled in the art that changes may be made without departing from the principles of the invention.

I claim:

1. In a voltage regulator circuit for controlling the output voltage from an A.C. source, the combination of a transformer having a primary winding coupled to said source and a secondary winding, a controlled rectifier bridge circuit coupled to said secondary winding, means for energizing said bridge circuit from a source of D.C. voltage, a linear reactor intercoupled between said bridge circuit and said source of D.C. voltage, and a magnetic amplifier operative responsive to changes in voltage of said A.C. source for controlling the operation of said bridge circuit.

2. In a voltage regulator circuit for controlling the output voltage from an A.C. source, the combination of a transformer having a primary winding coupled to said source and a center-tapped secondary winding, a pair of controlled rectifiers coupled to opposite end portions of said secondary winding, circuit means for coupling the center tap of said secondary winding to a source of D.C. voltage, a linear reactor intercoupled between said controlled rectifiers and said circuit means, and a magnetic amplifier coupled to said controlled rectifiers and to said A.C. source operative responsive to changes in voltage of said A.C. source for controlling the conduction of said rectifiers.

References Cited by the Examiner

UNITED STATES PATENTS

| 2,886,765 | 5/1959 | Hetzler | 322—28 |
| 3,128,440 | 4/1964 | Davis | 323—60 |

JOHN F. COUCH, *Primary Examiner.*

LLOYD McCOLLUM, *Examiner.*

W. H. BEHA, *Assistant Examiner.*